US008509589B2

(12) United States Patent
Park et al.

(10) Patent No.: US 8,509,589 B2
(45) Date of Patent: Aug. 13, 2013

(54) MOBILE TELECOMMUNICATION TERMINAL FOR RECEIVING BROADCAST PROGRAM

(75) Inventors: Hyun Sik Park, Seoul (KR); Hyung Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1199 days.

(21) Appl. No.: 11/537,541

(22) Filed: Sep. 29, 2006

(65) Prior Publication Data

US 2007/0071402 A1 Mar. 29, 2007

(30) Foreign Application Priority Data

| | | |
|---|---|---|
| Sep. 29, 2005 | (KR) | 10-2005-0091423 |
| Oct. 28, 2005 | (KR) | 10-2005-0102275 |
| Nov. 9, 2005 | (KR) | 10-2005-0106912 |

(51) Int. Cl.
*H04N 5/765* (2006.01)
*H04N 5/931* (2006.01)

(52) U.S. Cl.
USPC .......... 386/200; 386/204

(58) Field of Classification Search
USPC .......... 386/46
See application file for complete search history.

(56) References Cited

U.S. PATENT DOCUMENTS 6,172,712 B1 1/2001 Beard
6,665,751 B1 * 12/2003 Chen et al. .......... 710/52
7,509,091 B2 * 3/2009 Ito .......... 455/3.06
7,925,141 B2 * 4/2011 Geer et al. .......... 386/341
2003/0114136 A1 6/2003 Dietz et al.
2003/0208765 A1 * 11/2003 Urdang et al. .......... 725/90
2004/0052504 A1 * 3/2004 Yamada et al. .......... 386/68
2004/0136687 A1 * 7/2004 Ju .......... 386/46
2005/0166228 A1 * 7/2005 Takatori et al. .......... 725/39
2006/0182425 A1 * 8/2006 Boerger et al. .......... 386/120

FOREIGN PATENT DOCUMENTS

CN 1296700 5/2001
JP 09-284704 10/1997
JP 09-312827 12/1997
JP 10-150629 6/1998
JP 2000-339857 12/2000
JP 2003-061036 2/2003
JP 2004-015821 1/2004
JP 2005-253017 9/2005
KR 10-2004-0008556 A 7/2002
KR 10-2005-0073329 A 7/2005
WO 2005/086477 9/2005

* cited by examiner

*Primary Examiner* — William C Vaughn, Jr.
*Assistant Examiner* — Oluwaseun A Adegeye
(74) *Attorney, Agent, or Firm* — Lee, Hong, Degerman, Kang & Waimey

(57) ABSTRACT

The present invention relates to a method for receiving a broadcase program in a mobile communication terminal. The present invention includes receiving a broadcast program in the mobile communication terminal, recording the broadcast program when a first event occurs, playing back the recorded broadcast program when a second event occurs, manipulating the recorded broadcast program playback to eliminate a time lag between the recorded broadcast program playback and the received broadcast program, and determining whether the time lag between the recorded broadcast program playback and the received broadcast program is eliminated.

19 Claims, 14 Drawing Sheets

FIG. 9

| broadcast program structure | | | | | | | |
|---|---|---|---|---|---|---|---|
| scene1 | scene2 | scene3 | scene4 | scene5 | scene6 | scene7 | ... |
| 22:07 | 22:10 | 22:11 | 22:13 | 22:15 | 22:18 | 22:22 | 22:24 ... |
| park shin-yang<br>kim jung-eun | park shin-yang | lee jae-po | kim min-jung | park shin-yang | lee jae-po<br>park shin-yang | lee min-woo | ... |
| evening | morning | morning | morning | forenoon | night | night | ... |
| office | home | home | school | office | street | home | ... |
| kiss scene | rest scene | meal scene | lessons scene | business scene | fight scene | drink scene | ... |

MOBILE TELECOMMUNICATION TERMINAL FOR RECEIVING BROADCAST PROGRAM

CROSS-REFERENCE TO RELATED APPLICATIONS

Pursuant to 35 U.S.C. 119(a), this application claims the benefit of earlier filing date and right of priority to Korean Patent Application No. 10-2005-0091423 filed on Sep. 29, 2005, Korean Patent Application No. 10-2005-0102275 filed on Oct. 28, 2005, and Korean Patent Application No. 10-2005-0106912 filed on Nov. 9, 2005, the contents of which are all hereby incorporated by reference herein in their entirety.

This application claims the benefit of Korean Patent Application No. 10-2005-0091423 filed on Sep. 29, 2005, Korean Patent Application No. 10-2005-0102275 filed on Oct. 28, 2005, and Korean Patent Application No. 10-2005-0106912 filed on Nov. 9, 2005, which are hereby incorporated by reference as if fully set forth herein.

FIELD OF THE INVENTION

The present invention relates to a mobile telecommunication terminal, and more particularly, to a mobile telecommunication terminal for receiving a broadcast program.

BACKGROUND OF THE INVENTION

When using a mobile telecommunication terminal, a user may select a broadcast program to be recorded, and set the recording of the selected broadcast program. When the mobile telecommunication terminal receives the broadcast program, the terminal determines whether or not the received broadcast program corresponds to the recording-set broadcast program.

If it is determined that the received broadcast program corresponds to the recording-set broadcast program, the mobile telecommunication terminal records the received broadcast program. However, if the received broadcast program does not correspond to the recording-set broadcast program, the mobile telecommunication terminal does not record the received broadcast program. Meanwhile, when the mobile telecommunication terminal receives a playback signal for the recorded broadcast program from the user, the mobile telecommunication terminal plays back the recorded broadcast program.

However, in the above-mentioned conventional mobile telecommunication terminal, when a call is connected to the mobile telecommunication terminal during reception of a broadcast program, it is impossible to provide, to the user, the broadcast program received during the call connection of the mobile telecommunication terminal. Also, in the above-mentioned conventional mobile telecommunication terminal, it is impossible to provide, to the user, a broadcast program which is received during playback of the recorded broadcast program.

Accordingly, in the above-mentioned conventional mobile telecommunication terminal, an entire content of a received broadcast program is incompletely provided to the user when the broadcast program is received during playback of a recorded broadcast program. Furthermore, it is impossible to efficiently control recording and playback of broadcast programs. In addition, the memory capacity of the mobile telecommunication terminal may be rendered insufficient because it is impossible to record only a desired portion of a broadcast program.

SUMMARY OF THE INVENTION

The present invention is directed to receiving a broadcast program in a mobile communication terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for receiving a broadcast program in a mobile communication terminal, the method comprising receiving a broadcast program in the mobile communication terminal, recording the broadcast program when a first event occurs, playing back the recorded broadcast program when a second event occurs, manipulating the recorded broadcast program playback to eliminate a time lag between the recorded broadcast program playback and the broadcast program, and determining whether the time lag between the recorded broadcast program playback and the broadcast program is eliminated.

In one aspect of the present invention, the method further comprises ending the recording of the broadcast program when the time lag between the recorded broadcast program playback and the broadcast program is eliminated.

Preferably, the first event comprises at least one of the mobile communication terminal receiving a call, a user initiating a call, and a user pressing a key on the mobile communication terminal to begin recording.

Preferably, the second event comprises at least one of a call being disconnected, and a user pressing a key on the mobile communication terminal to begin playback.

In another aspect of the present invention, the method further comprises displaying the broadcast program when the time lag between the recorded broadcast program and the broadcast program is eliminated.

Preferably, the step of recording the broadcast program comprises recording a portion of the broadcast program. Preferably, the portion comprises at least one of the broadcast program without advertisements, a highlight of the broadcast program, and a specific frame of the broadcast program.

Preferably, the step of manipulating the recorded broadcast program playback comprises playing back a portion of the recorded broadcast program. Preferably, the portion comprises at least one of the broadcast program without advertisements, a highlight of the broadcast program, and a specific frame of the broadcast program. Preferably, specific frames of the broadcast program are played back in a slide show format. Preferably, the step of manipulating the recorded broadcast program playback comprises adjusting a playback speed.

Preferably, the step of determining whether the time lag between the recorded broadcast program playback and the broadcast program is eliminated comprises comparing a reception time of a specific frame of the recorded broadcast program currently being played back to a reception time of a specific frame of the broadcast program currently being broadcast.

Preferably, the step of determining whether the time lag between the recorded broadcast program playback and the broadcast program is eliminated comprises comparing a specific frame of the recorded broadcast program currently being played back to a specific frame of the broadcast program currently being received.

In a further aspect of the present invention, the method further comprises receiving identification codes for identifying contents of the broadcast program, and receiving time information for the contents of the broadcast program. Preferably, the identification codes and the time information are used for selectively recording a portion of the broadcast program. Preferably, the portion comprises at least one of the broadcast program without advertisements, a highlight of the broadcast program, and a specific frame of the broadcast program.

Preferably, the identification codes and the time information are used for selectively playing back a portion of the recorded broadcast program. Preferably, the portion comprises at least one of the broadcast program without advertisements, a highlight of the broadcast program, and a specific frame of the broadcast program.

In yet another aspect of the present invention, the method further comprises requesting to receive the identification codes and the timing information from a broadcast center.

In yet another aspect of the present invention, the method further comprises synchronizing video frames of the broadcast program with audio data of the broadcast program corresponding to the video frames.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIG. 9 is a schematic diagram illustrating an example of a broadcast program in accordance with one embodiment of the present invention.

DETAILED DESCRIPTION OF THE PREFERRED EMBODIMENTS

The present invention is related to receiving a broadcast program in a mobile communication terminal. Reference will now be made in detail to the preferred embodiments of the present invention, examples of which are illustrated in the accompanying drawings. Wherever possible, the same reference numbers will be used throughout the drawings to refer to the same or like parts.

Figure 1:
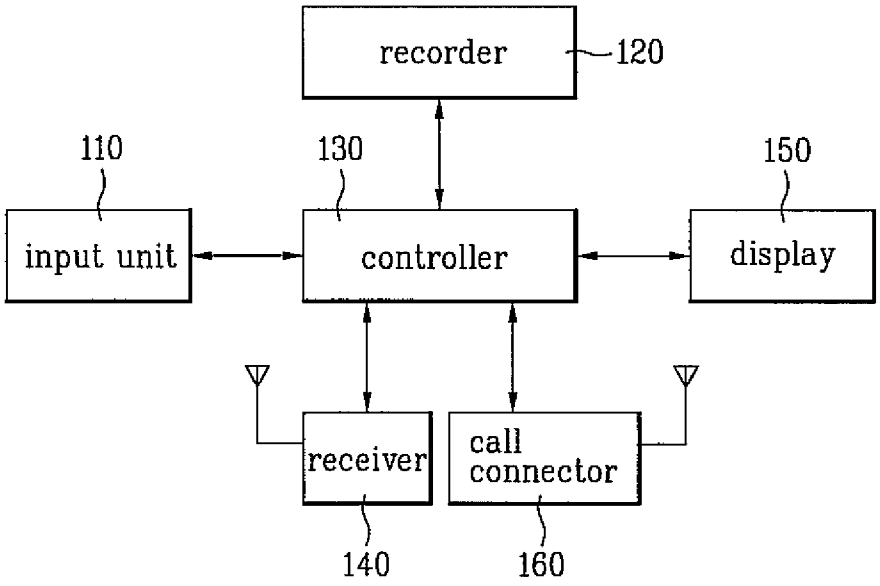
FIG. 1 is a block diagram illustrating a mobile telecommunication terminal having a broadcast program control function in accordance with one embodiment of the present invention.

A mobile telecommunication terminal having a broadcast program control function in accordance with one embodiment of the present invention will be described in detail with reference to FIG. 1. As shown in FIG. 1, the mobile telecommunication terminal includes an input unit 110, a recorder 120, a controller 130, a receiver 140, a display 150, and a call connector 160.

The input unit 110 receives various signals associated with operating the mobile telecommunication terminal. The signals may be input by the user, or may be automatically input under a predetermined condition. The input unit 110 includes a keypad or touch screen provided with a plurality of keys. The input unit 110 generates key data corresponding to a key selected by the user, and outputs the generated key data to the controller 130.

Preferably, in accordance with the present invention, the input unit 110 may receive recording-associated signals including a recording execution signal and a recorded broadcast playback signal. The input unit 110 may also receive a signal for selecting a specific portion of a broadcast program to be recorded or played back, in association with recording or playback of the broadcast program. Furthermore, in association with the recording or playback of the broadcast program, the input unit 110 may also receive an intrinsic identification code for selecting a specific content included in the broadcast program.

The input unit 110 may include a microphone for receiving a voice signal from the user. A signal converter may also be included for converting the received voice signal to a digital voice signal. Preferably, the input unit 110 receives a recording-associated signal including the recording execution signal or recorded broadcast playback signal in accordance with recognizing the voice signal input by the user. Accordingly, the voice signal comprises a user's voice signal instructing execution of the recording or playback of a recorded broadcast.

In accordance with the recording-associated signal from the input unit 110, the recorder 120 records a broadcast program received by the mobile telecommunication terminal, or plays back the recorded broadcast program. Preferably, in accordance with the present invention, the recorder 120 can selectively record a specific portion of the broadcast program, and can selectively play back a specific portion of the recorded broadcast program, based on the recording-associated signal. Preferably, the recorder 120 performs the playback of the recorded broadcast program at a playback speed adjusted in accordance with a speed designated by the user or an automatically-calculated speed.

The controller 130 controls the overall operation of the mobile telecommunication terminal. Preferably, the controller 130 controls the overall operation of the mobile telecommunication terminal associated with broadcast programs as well as the overall operation associated with mobile telecommunication. The controller 130 may include a broadcast program control module and a mobile telecommunication control module to control the above-described operations.

Preferably, the controller 130 controls operation of the input unit 110, the recorder 120, the receiver 140, the display 150, and the call connector 160. The controller 130 also determines whether or not a broadcast program, which is currently received by the receiver 140, is synchronous with a broadcast program recorded in the recorder 120. Accordingly, the controller 130 controls operation of the display 150 based on the determination.

The receiver 140 receives, from a broadcasting center, a broadcast program and information related to the broadcast program. The receiver 140 may include a broadcast program receiving module for receiving the broadcast program. Moreover, the receiver 140 may receive digital broadcast programs according to various systems, such as a digital audio broadcasting (DAB) system, a digital video broadcasting-terrestrial (DVB-T) system, a digital video broadcasting-handheld (DVB-H) system, a media forward link only (FLO) system, and a digital multimedia broadcasting system.

The display 150 displays various information, such as the status of the mobile telecommunication terminal. The display 150 may be a liquid crystal display (LCD), such as a super twisted nematic (STN) LCD or a thin film transistor (TFT) LCD. Alternatively, an organic electro-luminescent device may be used for the display 150. Preferably, the display 150 displays one of the broadcast program recorded by the recorder 120 and the broadcast program currently received by the receiver 140, in accordance with a control signal from the controller 130. Preferably, the display 150 may display the broadcast program played back by the recorder 120 at a speed exceeding a reference playback speed or in a slide show form. The call connector 160 connects a call to an external terminal via a mobile network.

Figure 2:
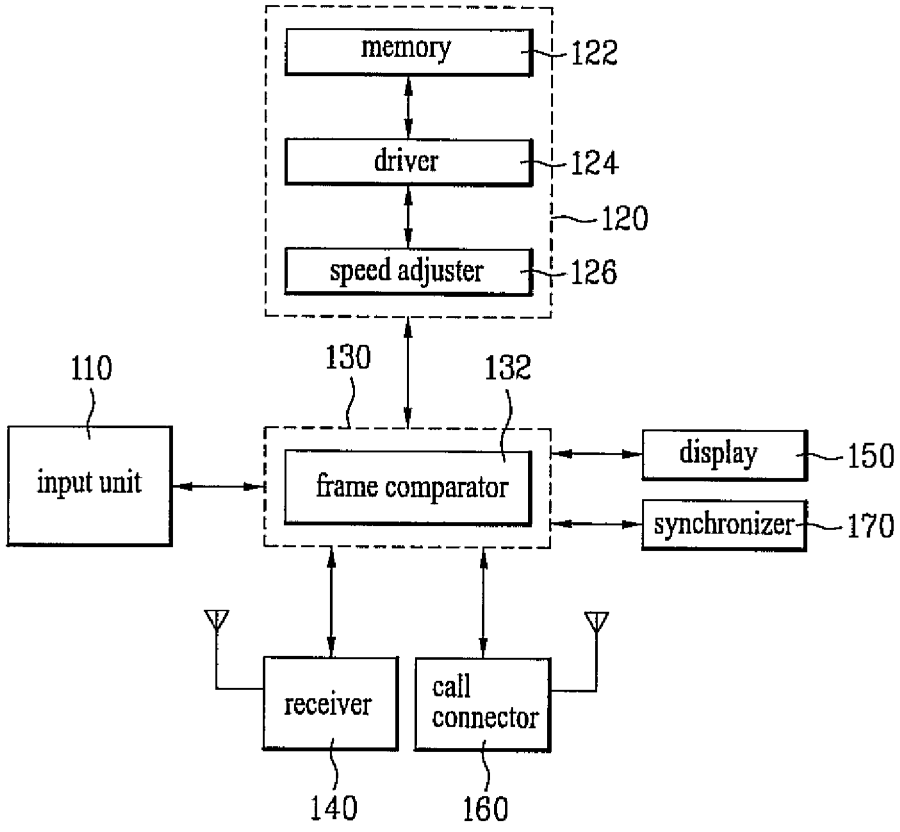
FIG. 2 is a block diagram illustrating a mobile telecommunication terminal having a broadcast program control function in accordance with one embodiment of the present invention.

The mobile telecommunication terminal, which has a broadcast program control function in accordance with the present invention, will be described in more detail with reference to FIG. 2. As shown in FIG. 2, the mobile telecommunication terminal includes a synchronizer 170, in addition to the input unit 110, the recorder 120, the controller 130, the receiver 140, the display 150, and the call connector 160.

The recorder 120 includes a memory 122 for recording a broadcast program in accordance with a recording execution signal, a speed adjuster 126 for adjusting the playback speed of the recorded broadcast program, and a driver 124 for playing back the recorded broadcast program at the adjusted playback speed in accordance with a recorded broadcast playback signal.

The memory 122 records a received broadcast program for a predetermined time in accordance with the recording execution signal. For example, when the mobile telecommunication terminal connects a call during reception of a broadcast program, the memory 122 records the broadcast program received during the call connection. Furthermore, when the mobile telecommunication terminal connects a call during reception of a broadcast program, the memory 122 also records the received broadcast program for a period of time beginning from when the call is connected to when the recorded broadcast program is synchronized with a currently-received broadcast program. Also, when the mobile telecommunication terminal executes a call connection during reception of a broadcast program, the memory 122 may record the received broadcast program for a period of time beginning from when the call connection is terminated to when the recorded broadcast program is synchronized with a currently-received broadcast program.

The memory 122 may also selectively record a specific portion of the received broadcast program in accordance with the recording execution signal and a select signal. For example, the memory 122 can record a broadcast program, from which advertising broadcasts are excluded, in accordance with the select signal. Also, the memory 122 can record at least one highlight included in the broadcast program in accordance with the select signal. The memory 122 can also record at least one frame selected from a plurality of frames included in the broadcast program in accordance with the select signal.

The speed adjuster 126 adjusts the playback speed in accordance with a speed designated at an optional point of time. The speed designation time point may be determined with reference to a point of time when the recorded broadcast playback signal is inputted.

For example, the speed may be designated before the recorded broadcast playback signal is inputted. In this case, the speed may be designated not only before reception of the broadcast program, but also during reception of the broadcast program. Alternatively, the speed may be designated before determining whether the received broadcast program should be recorded, and also during the recording of the broadcast program.

The speed may also be designated after the recorded broadcast playback signal is inputted. In this case, the speed may be repeatedly designated at least once after the recorded broadcast playback signal is inputted. However, the speed should only be designated until the recorded broadcast program is synchronized with a currently-received broadcast program even when the speed is designated after the recorded broadcast playback signal is inputted. This is because a recorded broadcast program no longer exists after the synchronization time point.

The speed adjuster 126 also determines a playback speed, based on a speed designated by the user. For example, when a playback speed increasing command from the user is inputted, the speed adjuster 126 adjusts the current playback speed to a speed corresponding to the playback speed increasing command. Likewise, when a playback speed decreasing command from the user is inputted, the speed adjuster 126 adjusts the current playback speed to a speed corresponding to the playback speed decreasing command. Also, when a playback stopping command from the user is inputted, the speed adjuster 126 stops the current playback operation.

Preferably, the speed adjuster 126 includes a key, such as a jog type button, for adjusting the playback speed. The button provides a user interface for receiving speed control commands from the user for playback speed increase, playback speed decrease, and playback stopping. Based on the speed designated by the user and the playback type, the speed adjuster 126 can determine whether a specific frame of the recorded broadcast program is to be played back at a speed exceeding a reference playback speed, or played back in a slideshow manner.

The speed adjuster 126 can also adjust the playback speed to an automatically-calculated speed. For example, the speed adjuster 126 can adjust the playback speed according to a recording capacity of the memory 122. The speed adjuster 126 can also adjust the playback speed to be higher than a reference playback speed in order to synchronize the recorded broadcast program with the currently-received broadcast program.

The driver 124 plays back the recorded broadcast program at the adjusted playback speed in accordance with the recorded broadcast playback signal. For example, the driver 124 may extract at least one frame selected from a plurality of frames constituting the broadcast program, and play back the extracted frame at the adjusted playback speed. The driver 124 may also play back the extracted frame at a playback speed adjusted to exceed the reference playback speed. In addition, the driver 124 may extract at least one of the frames constituting the broadcast program, and play back the extracted frame in a slideshow manner at the adjusted playback speed. The driver 124 may also play back the extracted frame in a slideshow manner at a playback speed adjusted to exceed the reference playback speed. On the other hand, when the driver 124 receives a playback stopping signal from the user during the playback of the broadcast program, the driver 124 stops the playback of the broadcast program.

The controller 130 includes a frame comparator 132 for comparing a frame of the currently-received broadcast program with frames of the recorded broadcast program. The frame comparator 132 performs the frame comparison according to reception time information contained in the compared frames. Accordingly, the frame comparator 132 can determine whether the recorded broadcast program is synchronized with the currently-received broadcast program. For example, when the reception time of a currently-played frame of the recorded broadcast program coincides with the reception time of a frame of the currently-received broadcast, the frame comparator 132 determines that the recorded broadcast program is synchronous with the currently-received broadcast program.

The synchronizer 170 synchronizes audio data of the broadcast program with frames of the broadcast program, wherein synchronization is achieved using a time table. For example, when at least one frame selected from the frames included in the broadcast program is recorded, the synchronizer 170 may extract audio data associated with the selected frame, using the time table, and may synchronize the extracted audio data with the selected frame. The synchronizer 170 may also synchronize the entire audio data of the broadcast program with the selected frame, based on the audio data associated with the selected frame. Preferably, when a broadcast program is recorded in a state in which advertising broadcasts are excluded from the broadcast program, the synchronizer 170 may extract audio data associated with the advertising broadcasts, exclude the extracted audio data from the entire audio data of the broadcast program, and synchronize the remaining audio data with the selected frame, using the time table.

Hereinafter, a method for broadcast program control of the mobile telecommunication terminal in accordance with embodiments of the present invention will be described with reference to FIGS. 2 and 3.

Figure 3:
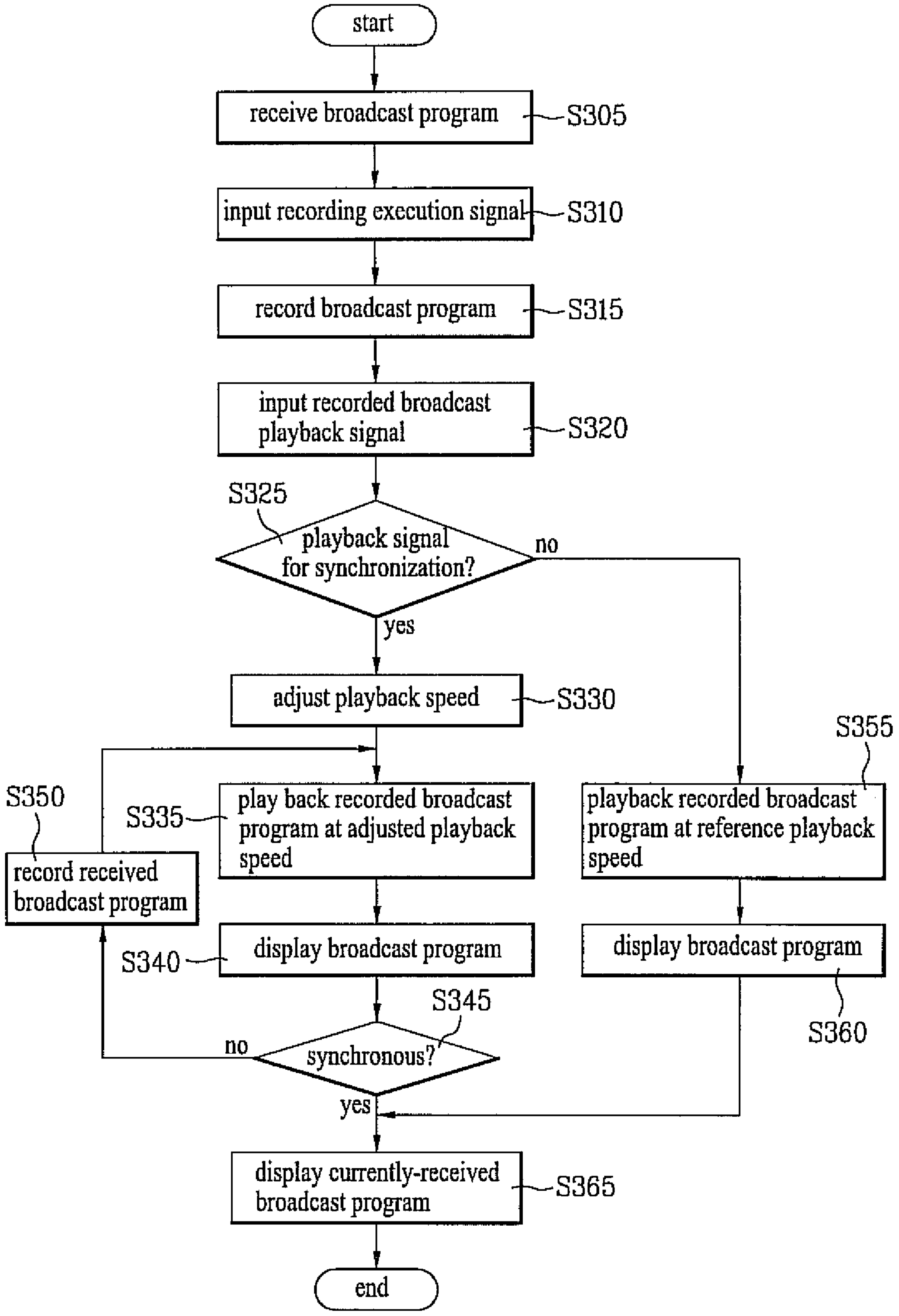
FIG. 3 is a flow chart illustrating a method for broadcast program control of the mobile telecommunication terminal in accordance with one embodiment of the present invention.

Referring to FIG. 3, the receiver 140 receives a broadcast program including a digital broadcast program (S305). Accordingly, the receiver 140 receives the broadcast program via a digital broadcasting network. Afterward, the input unit 110 receives a recording execution signal (S310). Preferably, the input unit 110 includes a key for receiving the recording execution signal from the user, wherein the key is selected from the keys equipped in the mobile telecommunication terminal. Alternatively, the input unit 110 may include a touch pad or touch screen for receiving an input. The input unit 110 may also recognize a voice signal, such that the user can instruct execution of the recording operation by inputting a voice command.

The recording execution signal is a signal that enables recording of a received broadcast program. Preferably, the recording execution signal is inputted in accordance with a user's selection or generation of a specific event.

The specific event may be when the call connector 160 connects a call to an external terminal via a mobile network. When a call connection is made by the call connector 160 during reception of the broadcast program by the receiver 140, the input unit 110 receives a reception/non-reception determination signal for determining whether the broadcast program is to be received in association with the call connection. The input unit 110 also receives a recording execution signal for enabling recording of the received broadcast program.

For example, when a SEND key equipped in the mobile telecommunication terminal is pressed, the input unit 110 can automatically receive the reception/non-reception determination signal and recording execution signal. Alternatively, the input unit 110 may receive the reception/non-reception determination signal and recording execution signal when a function key for receiving the recording execution signal is pressed a certain number of times. On the other hand, where automatic reception and recording execution have been set for a broadcast program which will be received during call connection, the input unit 110 can automatically receive the reception/non-reception determination signal and recording execution signal without any additional operation carried out by the user.

With regard to the call connection being made during reception of a broadcast program, the recording execution signal includes a signal for enabling recording of at least one of a broadcast program received during the call connection, a broadcast program received for a period of time from when the call connection starts to when a recorded broadcast program is synchronized with a currently-received broadcast program, and a broadcast program received for a period of time from when the call connection is terminated to the synchronization time point.

The input unit 110 also receives a signal for determining whether the broadcast program is to be displayed while simultaneously recording the broadcast program. For example, when it is determined, in accordance with a user's determination, that the broadcast program is to be displayed, the input unit 110 receives a recording execution signal and a display determination signal in association with the broadcast program. On the other hand, when it is determined, in accordance with a user's determination, that the broadcast program is not to be displayed, the input unit 110 receives only a recording execution signal in association with the broadcast program.

Referring to FIG. 3, the memory 122 records the received broadcast program in accordance with the recording execution signal (S315). For example, when a call connection is made during reception of a broadcast program, the memory 122 records at least one of a broadcast program received during the call connection, a broadcast program received for a period of time from when the call connection starts to when a recorded broadcast program is synchronized with a currently-received broadcast program, and a broadcast program received for a period of time from when the call connection is terminated to the synchronization time point.

The memory 122 can also record a specific portion of the received broadcast program in accordance with the recording execution signal and a recording type select signal. These signals may be input by the user, or may be generated in a default manner when specific conditions are satisfied. For example, the memory 122 may record at least one of a broadcast program, from which advertising broadcasts have been excluded, a highlight included in the broadcast program, and a specific frame included in the broadcast program, in accordance with the recording type select signal.

The controller 130 identifies the advertising broadcast, highlight, and frame included in the broadcast program, based on the recording type select signal, and performs a control operation for recording the broadcast program corresponding to the recording type select signal. For example, the advertising broadcast or highlight included in the broadcast program may be packet type data. Thus, the header of the data includes an identifier representing whether the data is an advertising broadcast or highlight. All frames included in the broadcast program include identifiers as described above, respectively. Accordingly, the controller 130 can identify the advertising broadcasts, highlights and specified frames of the broadcast program in accordance with recognizing the identifiers.

In accordance with the present invention, the method may further include the step of synchronizing the audio data of the broadcast program with specified frames of the broadcast program using the synchronizer 170. In this case, the synchronizer 170 performs the synchronization using a time table.

For example, when certain frames of a broadcast program are recorded, the synchronizer 170 extracts audio data associated with the frames using the time table and synchronizes the extracted audio data with the frames. Alternatively, when certain frames of a broadcast program are recorded, the synchronizer 170 may synchronize the entire audio data of the broadcast program with the frames with reference to audio data associated with the frames. On the other hand, when a broadcast program, from which advertising broadcasts have been excluded is recorded, the synchronizer 170 extracts and excludes audio data associated with the advertising broadcasts and synchronizes the remaining audio data of the broadcast program with the frames of the broadcast program using the time table.

Still referring to FIG. 3, the input unit 110 receives a recorded broadcast playback signal (S320). Preferably, the input unit 110 includes a key for receiving the recorded broadcast playback signal, wherein the key is selected from the keys equipped in the mobile telecommunication terminal. Alternatively, the input unit 110 may include a touch pad or touch screen for receiving an input. The input unit 110 may also recognize a voice signal, such that the user can instruct playback of recorded broadcasts using a voice command.

The recorded broadcast playback signal is a signal for enabling playback of a recorded broadcast program. Preferably, the recorded broadcast playback signal is inputted in accordance with a user's selection or generation of a specific event.

The specific event may be when the call connector 160 connects a call to an external terminal via a mobile network. When a call connection is made during reception of the broadcast program by the mobile telecommunication terminal, the input unit 110 receives a recorded broadcast playback signal in association with the call connection. For example, the recorded broadcast playback signal may be automatically inputted when an END key equipped in the mobile telecommunication terminal is pressed to terminate the call connection. Alternatively, the recorded broadcast playback signal may be inputted when a function key for receiving the recorded broadcast playback signal is pressed a certain number of times. On the other hand, where automatic playback of the recorded broadcast program is set to occur when the call connection is terminated, the recorded broadcast playback signal may be automatically inputted without any additional operation carried out by the user.

Referring to FIG. 3, the controller 130 determines whether the recorded broadcast playback signal is a playback signal for synchronization (S325). When it is determined that the recorded broadcast playback signal is not a playback signal for synchronization, the driver 124 plays back the recorded broadcast program at a reference playback speed (S355). Here, the reference playback speed is a normal speed at which the mobile telecommunication terminal plays back a broadcast program. Generally, the reference playback speed is equal to a broadcast program reception speed. Afterward, the display 150 displays the broadcast program played back at the reference playback speed (S360).

On the other hand, when it is determined that the recorded broadcast playback signal is a playback signal for synchronization, the speed adjuster 126 adjusts the playback speed for the recorded broadcast program (S330). The playback speed adjustment of the speed adjuster 126 is carried out based on the speed designated by the user. For example, when a playback speed increasing command from the user is inputted, the speed adjuster 126 adjusts the playback speed to a speed corresponding to the speed increasing command. Likewise, when a playback speed decreasing command from the user is inputted, the speed adjuster 126 adjusts the playback speed to a speed corresponding to the speed decreasing command. In addition, when a playback stopping command from the user is inputted, the speed adjuster 126 stops the current playback operation.

The speed adjuster 126 may also adjust the playback speed in accordance with an automatically-calculated speed. For example, the speed adjuster 126 can adjust the playback speed, based on a recording capacity of the memory 122. The speed adjuster 126 can also adjust the playback speed to a speed higher than a reference playback speed in order to synchronize the recorded broadcast program with the currently-received broadcast program.

In accordance with the speed designated by the user and a playback type, the speed adjuster 126 may also determine whether a specific frame of the recorded broadcast program is to be played back at a speed exceeding the reference playback speed or in a slideshow manner.

The driver 124 plays back the recorded broadcast program at the adjusted playback speed (S335). For example, the driver 124 may play back the recorded broadcast program at a speed exceeding the reference playback speed based on the adjusted playback speed or playback type. Alternatively, the driver 124 may extract at least one frame selected from a plurality of frames constituting the recorded broadcast program and play back the extracted frame in a slideshow manner based on the adjusted playback speed or playback type. The driver 124 may also play back the extracted frame in a slideshow manner at a playback speed adjusted to exceed the reference playback speed based on the adjusted playback speed or playback type. Furthermore, when the driver 124 receives a playback stopping signal from the user during playback of the broadcast program, the driver 124 stops playback of the broadcast program.

The driver 124 may also selectively play back a specific portion of the recorded broadcast program in accordance with a playback type select signal received from the user. For example, the driver 124 plays back at least one of a broadcast program from which an advertising broadcast has been excluded, a highlight included in the broadcast program, and a frame included in the broadcast program in accordance with the playback type select signal. The select signal may be inputted by the user or inputted in accordance with the playback type previously set in the mobile telecommunication terminal.

The display 150 displays the played-back broadcast program (S340). The display 150 may display the broadcast program at a speed exceeding the reference playback speed in accordance with the adjusted playback speed and playback type. Alternatively, the display 150 displays a specific frame extracted from the broadcast program in a slideshow manner in accordance with the adjusted playback speed and playback type.

In accordance with the playback type select signal, the display 150 also displays at least one of a broadcast program from which an advertising broadcast is excluded, a highlight included in the broadcast program, and a frame included in the broadcast program. Meanwhile, when the display 150 receives a broadcast program display stopping signal from the user, the display 150 stops display of the broadcast program, and displays a broadcast program which is currently received.

The controller 130 determines whether the recorded broadcast program is synchronous with the currently-received broadcast program (S345). Accordingly, based on reception time information contained in the frames constituting the broadcast program, the frame comparator 132 compares the frame of the currently-received broadcast program with the frames of the recorded broadcast program. Based on the result of the comparison, the controller 130 determines whether the recorded broadcast program is synchronized with the currently-received broadcast program.

For example, when the reception time of a current-played-back frame of the recorded broadcast program is "14:20:29", and the reception time of a currently-received broadcast program frame is "14:20:30", the controller 130 determines that the recorded broadcast program is synchronous with the currently-received broadcast program. Notably, the time taken for one frame to be played back after reception thereof (hereinafter, referred to as a "waiting time") is set to be "1 second" in the mobile telecommunication terminal. Accordingly, when the reception time of the current-played-back frame of the recorded broadcast program is 1 second earlier than the reception time of the currently-received broadcast program frame, the controller 130 determines that the recorded broadcast program is synchronous with the currently-received broadcast program.

Consequently, when the reception time of the current-played-back frame of the recorded broadcast program is "13:20:20", and the reception time of the currently-received broadcast program frame is "13:25:20", the controller 130 determines that the recorded broadcast program is asynchronous with the currently-received broadcast program.

The controller 130 may also determine the synchronization, based on the amount of a playback-waiting portion of the recorded broadcast program. For example, the controller 130 may determine a synchronization time point to be a point in time when there is no longer a recorded broadcast program to be played back. Accordingly, if there is a playback-waiting broadcast program portion in the memory 122, the controller 130 determines that no synchronization is made.

When it is determined that no synchronization is made, the recorder 120 records the currently-received broadcast program (S350). On the other hand, when it is determined that synchronization is made, the display 150 displays the currently-received broadcast program (S365).

The mobile telecommunication terminal according to the present invention can record the received broadcast program in various manners, based on information related to the broadcast program. Accordingly, the method for receiving the broadcast program information in the mobile telecommunication terminal will be described before the description of various recording methods according to the present invention.

The receiver 140 receives information related to a broadcast program from a broadcasting center transmitting the broadcast program. Preferably, the receiver 140 receives the information related to the broadcast program before receiving or recording the broadcast program. The broadcast program information may include identifier information for indicating an advertising broadcast included in the broadcast program, identifier information for indicating a highlight included in the broadcast program, and identifier information for indicating each frame of the broadcast program.

For example, when the mobile telecommunication terminal receives a broadcast program using a digital multimedia broadcasting (DMB) system, the receiver 140 may receive the broadcast program information via a fast information channel (FIC). Alternatively, the receiver 140 may receive the broadcast program information using an electronic program guide (EPG).

Figure 4A:
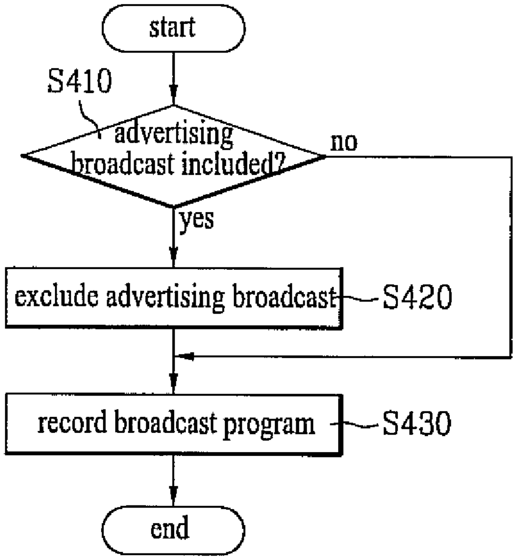
FIG. 4A is a flow chart illustrating a method for recording a broadcast program in accordance with one embodiment of the present invention.

Hereinafter, a method for recording a broadcast program, from which advertising broadcasts are excluded, will be described with reference to FIG. 4A. The controller 130 is capable of determining whether a received broadcast program includes an advertising broadcast. Accordingly, when the controller 130 receives an advertising program excluding signal from the user, the controller 130 determines whether the received broadcast program includes an advertising broadcast (S410).

The advertising broadcast is packet type data. For the data, an identifier representing an advertising broadcast is recorded in a certain field of the data. In accordance with recognizing such an identifier, the controller 130 can determine that an advertising broadcast is included in the broadcast program. For example, the identifier may be recorded in a reserved field or header field of the advertising broadcast data.

Using advertising broadcast identifier information included in the received broadcast program information, the controller 130 determines whether an advertising broadcast is included in the broadcast program. For example, when the identifier indicating an advertising broadcast included in the broadcast program corresponds to the identifier corresponding to the received identifier information, the controller 130 determines that an advertising broadcast is included in the broadcast program.

Based on the result of the determination, the controller 130 may exclude the advertising broadcast included in the broadcast program (S420). For example, the controller 130 can exclude the advertising broadcast by setting a data value of a portion of the broadcast program corresponding to the advertising broadcast to "0". The recorder 120 then records the broadcast program, from which the advertising broadcast, has been excluded (S430).

Figure 4B:
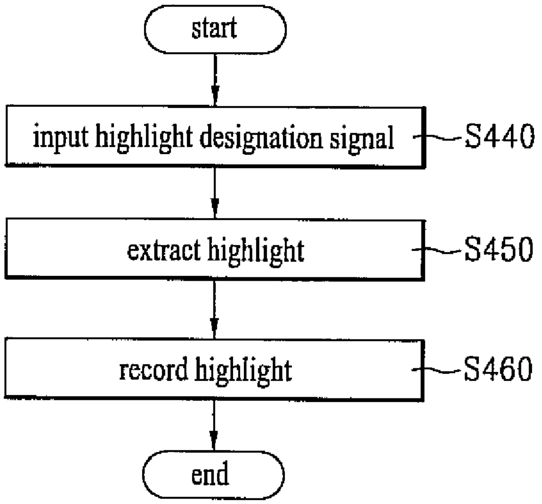
FIG. 4B is a flow chart illustrating a method for recording a broadcast program in accordance with one embodiment of the present invention.

Hereinafter, a method for recording a highlight included in the broadcast program will be described with reference to FIG. 4B. The input unit 110 receives a highlight designation signal from the user (S440). Based on the highlight designation signal, the controller 130 extracts a highlight included in the broadcast program (S450).

For the highlight, an identifier representing the highlight has been recorded in a certain field of the data of the highlight. In accordance with recognizing such an identifier, the controller 130 determines that a highlight is included in the broadcast program. For example, the identifier may be recorded in a reserved field or header field of the highlight data.

Using highlight identifier information included in the received broadcast program information, the controller 130 extracts the highlight corresponding to the identifier information.

For example, where the broadcast program is news, the highlight may include weather news, traffic news or other news flashes. Where a news flash is included in a broadcast program, the highlight of the broadcast program may be the news flash. The recorder 120 then records the highlight extracted from the broadcast program (S460).

Figure 4C:
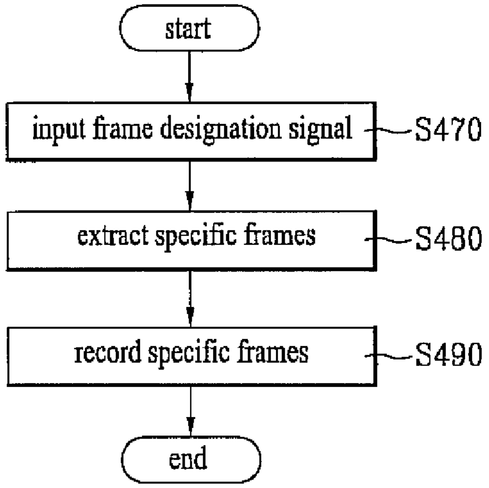
FIG. 4C is a flow chart illustrating a method for recording a broadcast program in accordance with one embodiment of the present invention.

Hereinafter, a method for recording a specific frame included in the broadcast program will be described with reference to FIG. 4C. The input unit 110 receives a signal designating a specific frame from the user (S470). The designation signal represents a signal instructing periodic designation of selected frames in the broadcast frame. Accordingly, the designation signal may be a signal for setting a frame designation interval.

The controller 130 then extracts a specific frame from the broadcast program in accordance with the designation signal (S480). For example, when the designation signal is a signal instructing designation of one frame every 1 second, the controller 130 extracts one frame from the broadcast program every 1 second. The recorder 120 then records the specific frame extracted from the broadcast program (S490).

Hereinafter, various embodiments of a method for playing back the recorded broadcast program in accordance with the present invention will be described with reference to FIGS. 2, 5A, 5B, and 5C. The mobile telecommunication terminal according to the present invention plays back the broadcast program in various manners, using information related to the broadcast program.

Figure 5A:
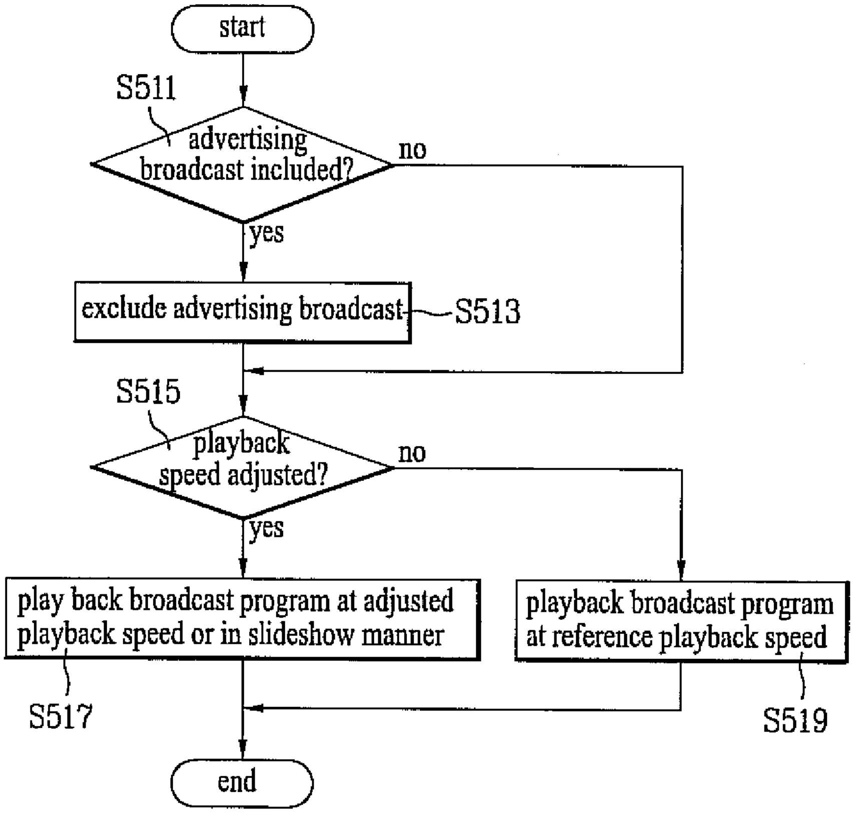
FIG. 5A is a flow chart illustrating a method for playing back a recorded broadcast program in accordance with one embodiment of the present invention.

First, a method for playing back a broadcast program, from which an advertising broadcast is excluded, will be described with reference to FIG. 5A. The controller 130 is capable of determining whether an advertising broadcast is included in the recorded broadcast program. Accordingly, when the controller 130 receives an advertising broadcast excluding command from the user, the controller 130 determines whether the broadcast program includes an advertising broadcast (S511).

The advertising broadcast is packet type data. For the data, an identifier representing an advertising broadcast is recorded in a certain field of the data. In accordance with recognizing such an identifier, the controller 130 may determine that an advertising broadcast is included in the broadcast program. Based on the result of the determination, the controller 130 excludes the advertising broadcast included in the broadcast program (S513).

The controller 130 then determines whether the playback speed of the broadcast program is adjusted by the speed adjuster 126 (S515). When it is determined that the playback speed of the broadcast program is adjusted, the driver 124 plays back the broadcast program, from which the advertising broadcast is excluded, based on the adjusted playback speed or playback type (S517).

For example, the driver 124 plays back the broadcast program, from which the advertising broadcast is excluded, at a playback speed exceeding the reference playback speed, based on the adjusted playback speed or playback type. Alternatively, the driver 124 may extract at least one frame selected from a plurality of frames constituting the broadcast program, and may play back the extracted frame in a slideshow manner, based on the adjusted playback speed or playback type.

For example, when the adjusted playback speed is double the reference playback speed, and the playback type is an accelerated-speed playback, the driver 124 plays back the broadcast program, from which the advertising broadcast is excluded, at a speed double the reference playback speed.

On the other hand, when the adjusted playback speed is double the reference playback speed, and the playback type is a slideshow type, the driver 124 plays back the frames of the broadcast program, from which the advertising broadcast is excluded, such that one frame is played back every 2 seconds. Here, it is assumed that one frame is played back every 1 second at the reference playback speed.

When it is determined that no adjustment of the playback speed is made, the driver 124 plays back the broadcast program, from which the advertising broadcast is excluded, at the reference playback speed (S519).

Figure 5B:
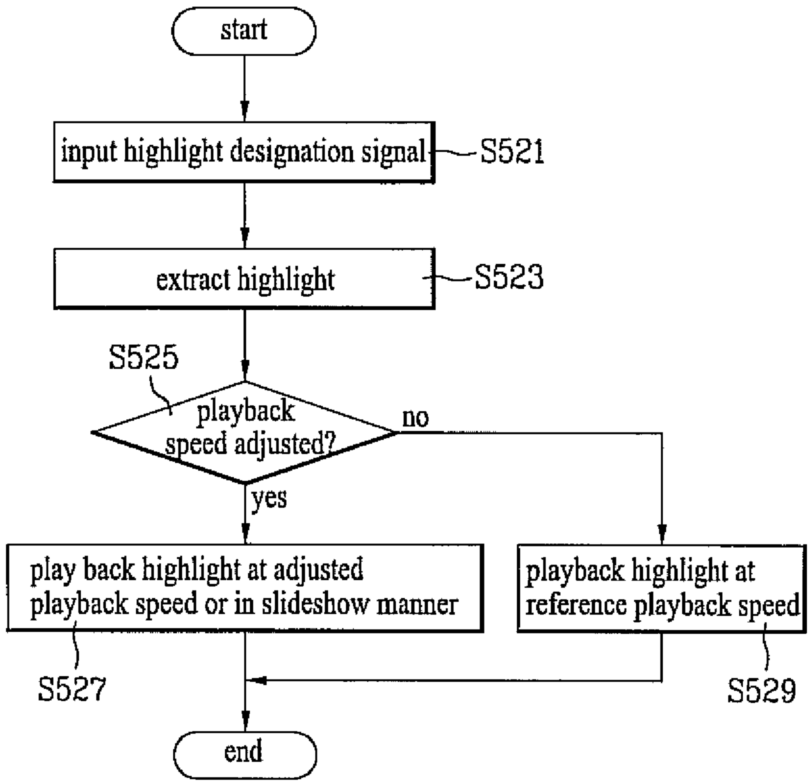
FIG. 5B is a flow chart illustrating a method for playing back the recorded broadcast program in accordance with one embodiment of the present invention.

Hereinafter, a method for playing back a highlight included in the broadcast program will be described with reference to FIG. 5B. The input unit 110 receives a highlight designation signal from the user (S521). Based on the highlight designation signal, the controller 130 extracts a highlight included in the broadcast program (S523).

The highlight is packet type data. For the highlight, an identifier representing the highlight is recorded in a certain field of the data of the highlight. Using highlight identifier information included in the received broadcast program information, the controller 130 extracts a highlight corresponding to the identifier information from the broadcast program.

The controller 130 then determines whether the playback speed of the broadcast program is adjusted by the speed adjuster 126 (S525). When it is determined that the playback speed of the broadcast program is adjusted, the driver 124 plays back the highlight extracted from the broadcast program, based on the adjusted playback speed or playback type (S527).

For example, the driver 124 plays back the highlight at a playback speed exceeding the reference playback speed or in a slideshow manner, based on the adjusted playback speed or playback type. On the other hand, when it is determined that no adjustment of the playback speed is made, the driver 124 plays back the highlight at the reference playback speed (S529).

Figure 5C:
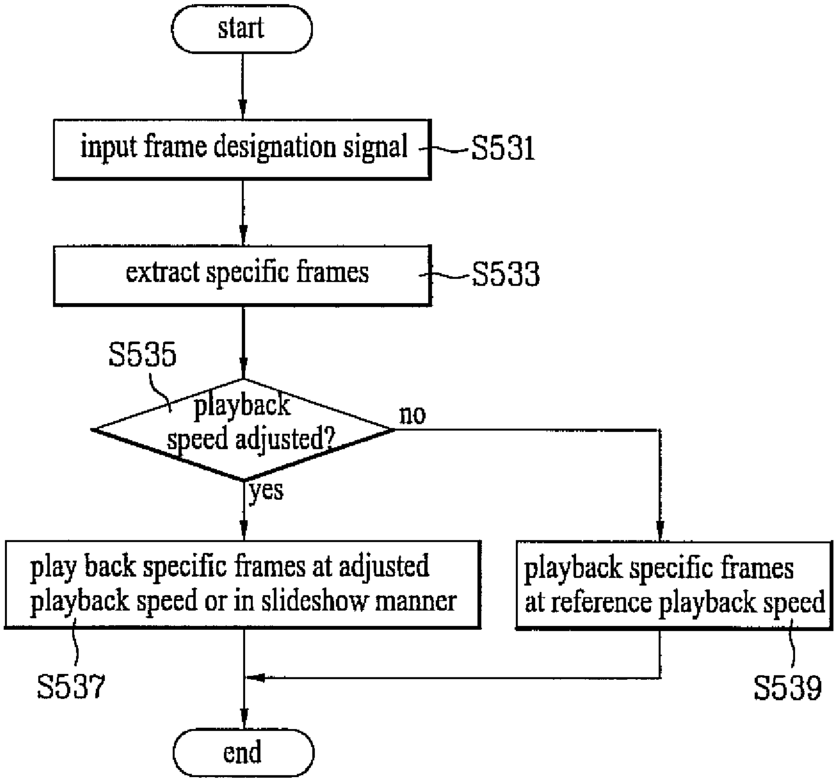
FIG. 5C is a flow chart illustrating a method for playing back the recorded broadcast program in accordance with one embodiment of the present invention.

Hereinafter, a method for playing back specific frames included in the broadcast program will be described with reference to FIG. 5C. The input unit 110 receives a signal designating specific frames from the user (S531). The designation signal represents a signal instructing periodic designation of selected frames in the broadcast program. Accordingly, the designation signal may be a signal for setting a frame designation interval.

The controller 130 then extracts specific frames from the broadcast program in accordance with the designation signal (S533). The controller 130 then determines whether the playback speed of the broadcast program is adjusted by the speed adjuster 126 (S535).

When it is determined that the playback speed of the broadcast program is adjusted, the driver 124 plays back the specific frames extracted from the broadcast program, based on the adjusted playback speed or playback type (S537).

For example, the driver 124 plays back the specific frames at a playback speed exceeding the reference playback speed or in a slideshow manner, based on the adjusted playback speed or playback type. On the other hand, when it is determined that no adjustment of the playback speed is made, the driver 124 plays back the specific frames at the reference playback speed (S539).

Hereinafter, synchronization of a recorded broadcast program with a currently-received broadcast program in accordance with the present invention will be described in detail with reference to FIG. 6.

Figure 6:
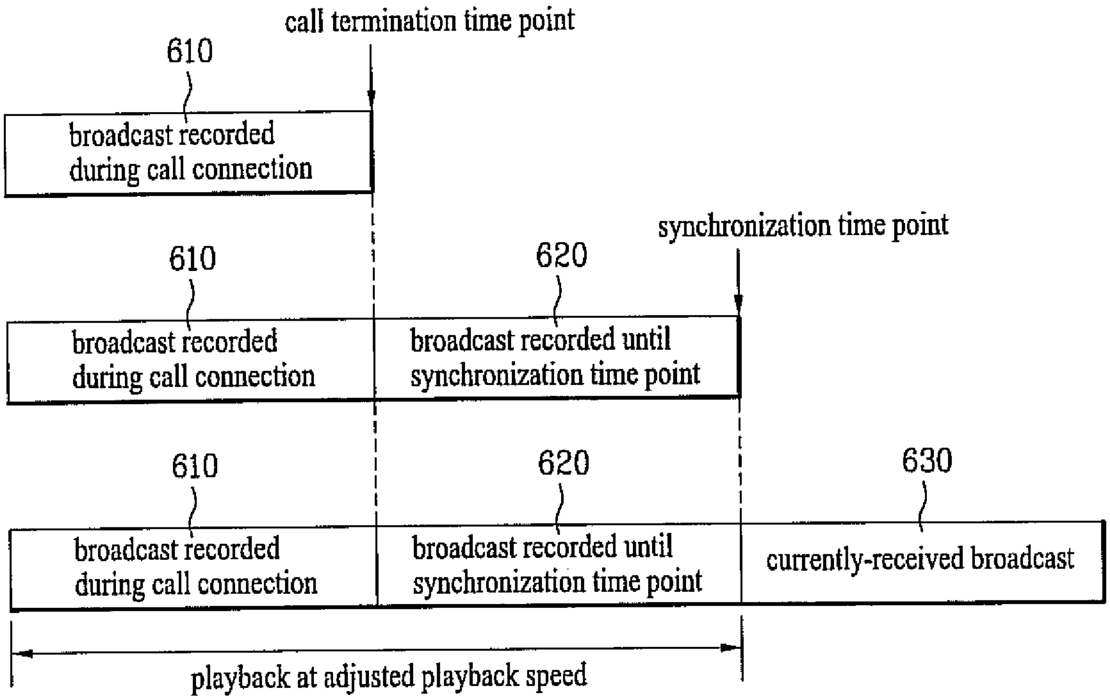
FIG. 6 is a schematic diagram illustrating synchronization of a recorded broadcast program with a currently-received broadcast program in accordance with one embodiment of the present invention.

In FIG. 6, reference numeral 610 designates a broadcast program recorded during a call connection. The broadcast program 610 represents a broadcast program received and recorded during a call connection made by the mobile telecommunication terminal.

Reference numeral 620 designates a broadcast program recorded until synchronization is made. The broadcast program 620 represents a broadcast program recorded for a period of time beginning from when the call connection is terminated to the point of time when synchronization is made.

The broadcast program 620 is recorded successively to the broadcast program 610 recorded during the call connection. Accordingly, when the recorded broadcast program is asynchronous with the currently-received broadcast program at the point of time when the call connection is terminated, the mobile telecommunication terminal can record the currently-received broadcast program, successively to the broadcast program 610 recorded during the call connection. In this case, the currently-received broadcast program becomes the broadcast program 620 recorded until the synchronization time point.

The broadcast program 610 recorded during the call connection and the broadcast program 620 recorded until the synchronization time point are played back at a playback speed adjusted to a speed designated by the user or a speed automatically calculated by the mobile telecommunication terminal. Preferably, the designated speed or automatically-calculated speed exceeds the reference playback speed so that the recorded broadcast program may be synchronized with the currently-received broadcast program.

Reference numeral 630 designates the currently-received broadcast program. The broadcast program 630 represents a broadcast program received after the synchronization time point. The currently-received broadcast program 630 can be displayed in a real time basis in accordance with a user's selection under the condition in which the currently-received broadcast program 630 is synchronized with the recorded broadcast programs 610 and 620. In this state, the mobile telecommunication terminal automatically stops the recording of the currently-received broadcast program 630.

Figure 7:
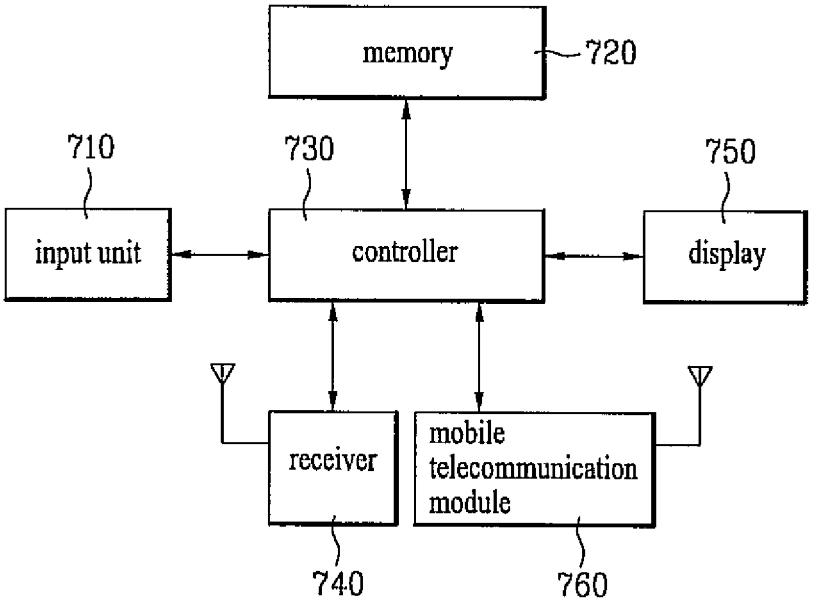
FIG. 7 is a block diagram illustrating a mobile telecommunication terminal having a broadcast program control function in accordance with one embodiment of the present invention.

Hereinafter, a mobile telecommunication terminal having a broadcast program control function in accordance with the present invention will be described in more detail with reference to FIG. 7. As shown in FIG. 7, the mobile telecommunication terminal includes an input unit 710, a memory 720, a controller 730, a receiver 740, a display 750, and a mobile telecommunication module 760.

The input unit 710 receives a signal for executing a function selected from various functions set in the mobile telecommunication terminal. Preferably, in accordance with the present invention, the input unit 710 receives, from the user, an intrinsic identification code set for a specific content included in a broadcast program. The input unit 710 also receives a recording execution signal or recorded broadcast playback signal for the content selected in accordance with the input of the intrinsic identification code. The intrinsic identification code is set by a broadcasting center, which produces the broadcast program, in order to distinguish the associated content from other contents.

The memory 720 stores a control program for controlling the overall operation of the mobile telecommunication terminal. The memory 720 also stores data input or output in accordance with the operation of the mobile telecommunication terminal. Preferably, in accordance with the present invention, the memory 720 records a broadcast program received by the receiver 740. Furthermore, the memory 720 also records an intrinsic identification code received by the mobile telecommunication module 760, in order to selectively record the content designated by the intrinsic identification code.

The controller 730 controls the overall operation of the mobile telecommunication terminal. Preferably, the controller 730 not only controls operations associated with broadcast programs, but also controls operations associated with mobile communication. Preferably, in accordance with the present invention, the controller 730 controls the memory 720 to record a content corresponding to the inputted intrinsic identification code. When no intrinsic identification code set for a content included in a broadcast program to be recorded is stored in the memory 720, the controller 730 controls the mobile telecommunication module 760 to request such an intrinsic identification code.

The receiver 740 includes a broadcast receiving module for receiving a predetermined signal from a broadcasting center via a broadcasting network. The broadcast receiving module receives a broadcast program and information related to the broadcast program from the broadcasting center. Preferably, the receiver 740 receives a broadcast program including a plurality of contents, and broadcast program information including intrinsic identification codes for respective contents.

The display 750 displays the status of the mobile telecommunication terminal and various information. The display 750 also displays the received broadcast program. In particular, in accordance with the present invention, the display 750 displays contents recorded in the memory 720.

The mobile telecommunication module 760 is a means for performing data transmission and reception with the mobile network. Preferably, in accordance with the present invention, the mobile telecommunication module 760 uses the mobile network as one of a plurality of return channels for broadcasting networks for transmitting broadcast programs. Accordingly, the mobile telecommunication module 760 requests the broadcasting center to transmit an intrinsic identification code using the mobile network.

Hereinafter, a method for broadcast program control of the mobile telecommunication terminal according to the present invention will be described in detail with reference to FIGS. 7 and 8.

The receiver 740 receives a broadcast program including a plurality of contents (S810). The receiver 740 also receives information related to intrinsic identification codes set for respective contents. For example, the receiver 740 can receive information related to the intrinsic identification codes using an electronic program guide (EPG) in case of DMB, or an electronic service guide (ESG) in case of DVB-H. Preferably, the receiver 740 receives the information related to the intrinsic identification codes using a data broadcasting channel.

The information related to the intrinsic identification codes include intrinsic identification codes for respective contents and time information of the contents respectively corresponding to the intrinsic identification codes. Here, the time information of each of the contents includes the start and end time points of each content.

Hereinafter, the structure of a broadcast program comprising a plurality of contents, for which respective intrinsic identification codes are set, will be described with reference to FIG. 9. As shown in FIG. 9, the broadcast program includes a plurality of contents (scenes in FIG. 9). Preferably, at least one intrinsic identification code is set for each content.

The broadcast program also includes time information related to each content, namely, start and end time points of each content. A plurality of intrinsic identification codes may be set for each content. Preferably, the intrinsic identification codes have an architectural structure.

For example, four intrinsic identification codes have been set for the scene 4. Namely, "Kim Min-Jung" has been set as the character, "morning" has been set as a time background, "school" has been set as a spatial background, and "lessons" have been set as a content background. It can be seen that the above-described intrinsic identification codes form the architectural structure. The scene 4 also includes time information for informing that the scene 4 starts at 22:13, and ends at 22:15.

Although not shown, audio broadcast programs may also have a configuration similar to the above-described configuration. When it is assumed that an audio broadcast program is broadcasted in the order of "advertisement" (15:00 to 15:02)→"explanation of MC" (15:02 to 15:04)→"music" (15:04 to 15:08)→"explanation of MC" (15:08 to 15:20)→"conversation of MC with guest" (15:20 to 15:30)→"music" (15:30 to 15:35), the above-described "advertisement", "explanation of MC", and "music" are contents constituting the audio broadcast program, respectively.

In this case, the intrinsic identification codes of the contents are information representing the subject matter of the contents, respectively. Accordingly, one intrinsic identification code may represent "music" broadcast in the audio broadcast program, and another intrinsic identification code may represent "advertisement" broadcast in the audio broadcast program.

In this case, the intrinsic identification codes may have an architectural structure. Although the contents "music" of the above-described audio broadcast program have the same content background, the "music" broadcast between the former "explanation of MC" and the later "explanation of MC" may have a subject matter different from the "music" broadcast following "conversation of MC with guest". Accordingly, for the music contents, it is necessary to provide different intrinsic identification codes representing different kinds of music, respectively. For example, when an intrinsic identification code "music/POP" is used, it represents a content "popular music". In such a manner, it is possible to represent even the singer of the "music", using an intrinsic identification code.

Figure 8:
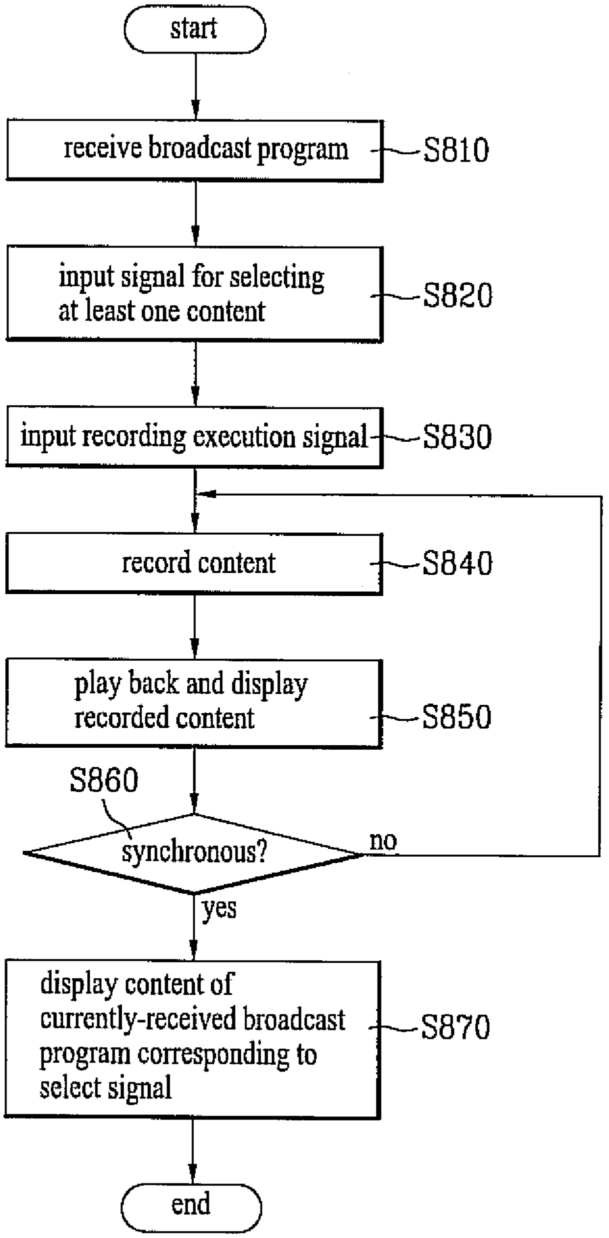
FIG. 8 is a flow chart illustrating a method for broadcast program control of the mobile telecommunication terminal in accordance with one embodiment of the present invention.

Referring to FIGS. 7 and 8, the input unit 710 receives a content select signal in association with at least one of the contents of the broadcast program (S820). Where an intrinsic identification code set for a specific content has been input from the user, the input unit 710 also receives a select signal for the specific content.

For example, various intrinsic identification codes may be set for various subject matters of contents. For example, the type of the content such as "news" or "music", and the language of the content such as "English", "Korean", or "Japanese" may be set using intrinsic identification codes, along with the place, time, and characters of the content.

The input unit 710 then receives a recording execution signal for the content selected in accordance with the select signal (5830). The input unit 710 includes a key for receiving the recording execution signal. This key is selected from the keys equipped in the mobile telecommunication terminal. The input unit 110 may also receive the recording execution signal using a touch pad or touch screen. The input unit 110 may also recognize a voice signal from the user instructing execution of a recording operation as the recording execution signal.

The recording execution signal is a signal for enabling recording of the selected content. The recording execution signal is input in accordance with a user's selection or generation of a specific event. When a call is received by the mobile telecommunication module 760, the input unit 710 may receive a reception/non-reception determination signal and a recording execution signal for the broadcast program.

The mobile telecommunication module 760 performs a call connection to an external terminal via a mobile network. When the call connection is made by the mobile telecommunication module 760 during reception of a broadcast program by the receiver 740, the input unit 710 can receive the reception/non-reception determination signal and recording execution signal in association with the call connection.

For example, when a SEND key equipped in the mobile telecommunication terminal is pressed, the input unit 710 can automatically receive the reception/non-reception determination signal and recording execution signal. Alternatively, the input unit 710 may receive the reception/non-reception determination signal and recording execution signal when a function key for reception of the recording execution signal is pressed a certain number of times. On the other hand, where automatic reception and recording execution have been set for a broadcast program which will be received during call connection, the input unit 710 can automatically receive the reception/non-reception determination signal and recording execution signal without any additional operation carried out by the user.

In association with the case in which call connection is made during reception of a broadcast program, the recording execution signal includes a signal for enabling recording of at least one of a broadcast program received during the call connection, a broadcast program received for a period of time from the point of time when the call connection starts to the point of time when synchronization is made, and a broadcast program received for a period of time from the point of time when the call connection is terminated to the synchronization time point.

The memory 720 selectively records at least one content in accordance with the content select signal and recording execution signal (S840). This will be described in conjunction with the case in which specific contents selected from the broadcasting program shown in FIG. 9 in accordance with the content select signal are recorded.

When the user inputs an intrinsic identification code "Park Shin-Yang", the memory 720 records only the contents, for which the intrinsic identification code "Park Shin-Yang" has been set, namely, the scene 1, scene 2, scene 5, and scene 6.

On the other hand, when the user inputs intrinsic identification codes "Park Shin-Yang" and "Office", the memory 720 records only the contents, for which the intrinsic identification codes "Park Shin-Yang" and "Office" have been set, namely, the scene 1 and scene 5.

In this case, the controller 730 controls the memory 720 to record the contents, for which the input intrinsic identification codes have been set, while referring to the start and end time points of the contents. The memory 720 also records the intrinsic identification codes and time information of the selected contents, along with the selected contents. Accordingly, the user can conveniently retrieve the recorded contents, based on the recorded intrinsic identification codes and time information. The memory 720 can record the selected contents during reception of the broadcast program, and also record the selected contents before the reception of the broadcast program.

The display 750 displays the recorded contents when the recorded contents are played back by the controller 730 (S850). The display 750 displays the recorded contents at a speed set by the user or a predetermined speed. The display 750 may also display the recorded contents in a slideshow manner in accordance with a user's selection.

Meanwhile, if a display stopping signal for the contents is input from the user, the display 750 stops displaying of the contents, and displays a broadcast program which is currently received.

The controller 730 determines whether the recorded contents are synchronous with the content of the currently-received broadcast program (S60). Based on reception time information contained in the frames constituting the recorded contents, the controller 730 compares the frame of the content of the currently-received broadcast program with the frames of the recorded contents. Based on the result of the comparison, the controller 730 determines whether the recorded contents are synchronous with the content of the currently-received broadcast program.

For example, when the reception time of the current-played-back frame of the recorded contents is "14:20:29" and the reception time of the frame of the currently-received content is "14:20:29", the controller 730 determines that the recorded contents are synchronous with the currently-received content.

The controller 730 may also determine the synchronization, based on the amount of a playback-waiting portion of the recorded contents. For example, when there is a playback-waiting content portion in the memory 720, the controller 730 determines that no synchronization is made. On the other hand, when there is no playback-waiting content portion in the memory 720, the controller 730 determines that synchronization is made. This is because the controller 730 determines the point of time, when there is no longer a recorded broadcast program, to be a synchronization time point.

When it is determined that no synchronization is made, the memory 720 continuously records the content of the received broadcast program corresponding to the content select signal. On the other hand, when it is determined that synchronization is made, the content corresponding to the content select signal is extracted from the currently-received broadcast program, and the extracted content is displayed by the display 750 (S870). When there is no content corresponding to the content select signal, the display 750 displays the entire portion of the currently-received broadcast program.

Figure 10:
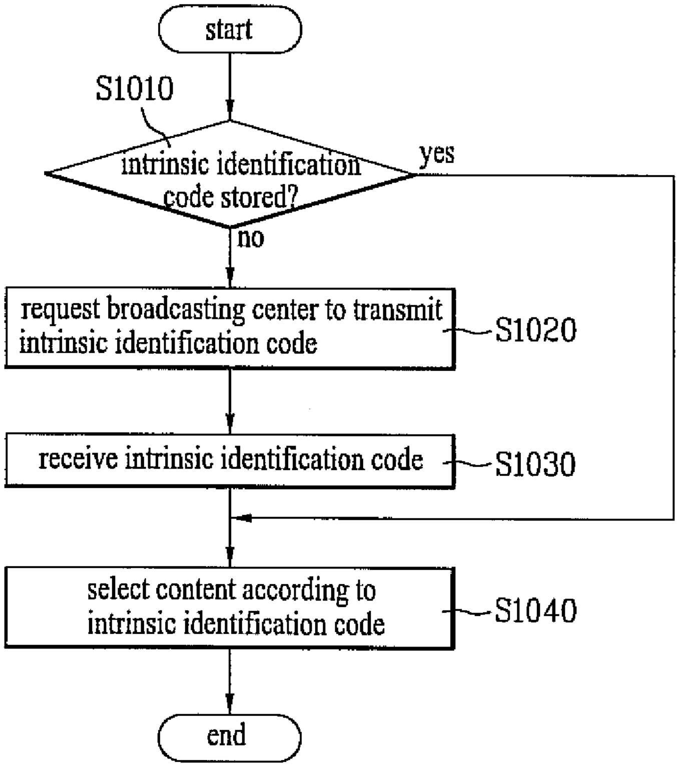
FIG. 10 is a flow chart illustrating a method for receiving intrinsic identification codes in accordance with one embodiment of the present invention.

Hereinafter, a method for receiving intrinsic identification codes in accordance with the present invention will be described with reference to FIGS. 7 and 10. The controller 730 determines whether there is an intrinsic identification code stored in the memory 720 in association with a broadcast program set to be recorded (S1010).

When it is determined that there is no stored intrinsic identification code, the controller 730 requests the broadcasting center, which transmits the broadcast program, to transmit an intrinsic identification code associated with the broadcast program, via a return channel (S1020). The return channel includes a mobile network as well as a broadcasting network. For example, where a mobile network is used as the return channel, the controller 730 requests the intrinsic identification code via the mobile module 760.

Although not shown in FIG. 7, the mobile telecommunication terminal may include a mobile Internet module for performing data transmission and reception with a mobile Internet when the mobile Internet is used as the return channel. In this case, it is possible to request the broadcasting center to transmit the intrinsic identification code via the mobile Internet module.

The receiver 740 receives the requested intrinsic identification code from the broadcasting center (S1030). The reception of the intrinsic identification code by the receiver 740 may be achieved via a data broadcasting channel. Alternatively, the mobile telecommunication module 760 may receive the requested intrinsic identification code from the broadcasting center via the mobile network.

Figure 11:
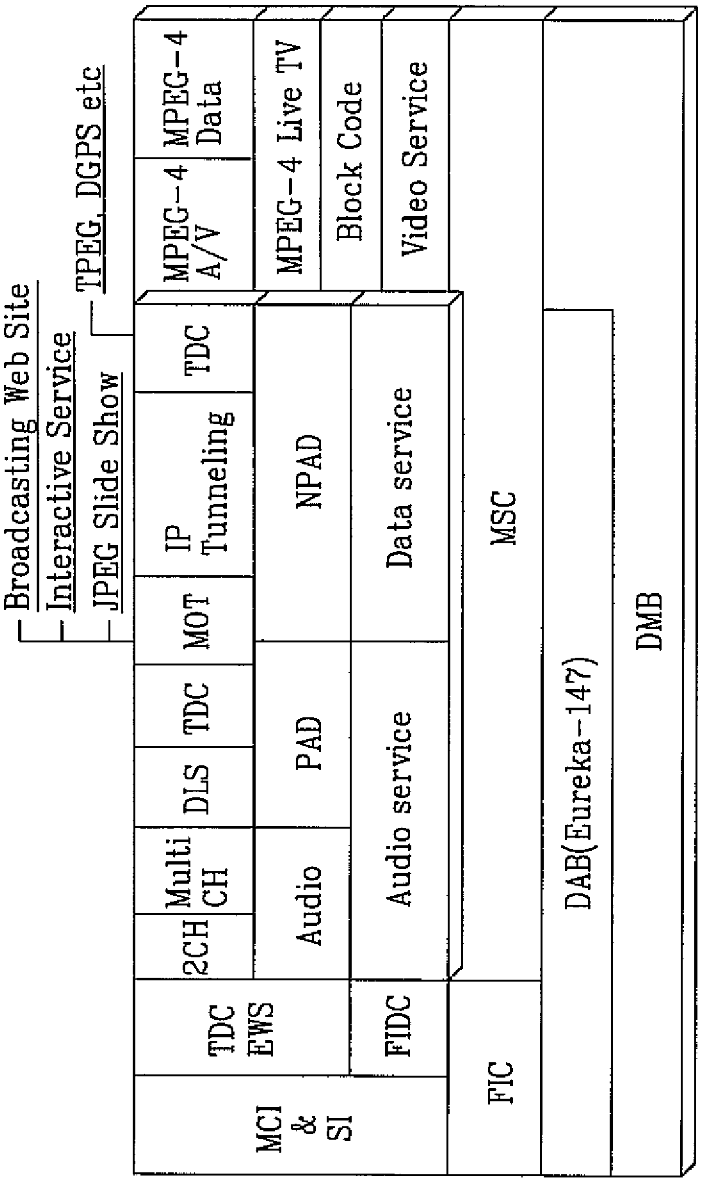
FIG. 11 is a schematic diagram illustrating a protocol stack for terrestrial digital multimedia broadcasting (DMB).

Hereinafter, the data broadcasting channel will be described with reference to a protocol stack of a terrestrial DMB (T-DMB), such as the one illustrated in FIG. 11. When using a data broadcasting channel in T-DMB as a transmission channel for the intrinsic identification code, it is preferred that a multimedia object transfer (MOT) protocol be used. However, the data broadcasting channel is not limited to MOT. Another data broadcasting channel, such as a transparent data channel (TDC), may be used for example.

Also, the present invention is not limited to T-DMB. That is, the present invention may be applied to digital broadcasts according to various digital broadcasting standards using a fixed or mobile terminal for digital broadcasts as a receiver, for example, satellite DMB (S-DMB), DAB, DVB-T, DVB-H, and FLO.

The controller 730 then selects at least one of the contents included in the broadcast program in accordance with received intrinsic identification codes (S1040). The input unit 710 receives at least one intrinsic identification code selected from the received intrinsic identification codes by the user, and receives a signal for selecting the content, for which the selected intrinsic identification code has been set. In this case, the controller 730 controls the input unit 710 to receive the content select signal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, in accordance with the present invention, it is possible to record a broadcast program received for a period of time from a recording execution time point to the point of time when the recorded broadcast program is synchronized with the currently-received broadcast program.

In accordance with the present invention, it is possible to effectively synchronize the recorded broadcast program with the currently-received broadcast program because the recorded broadcast program can be played back at an adjusted playback speed or specific frames extracted from the recorded broadcast program can be played back in a slideshow manner.

In accordance with the present invention, it is also possible to selectively record a specific portion of the broadcast program because the recording type of the broadcast program can be selected by the user.

Since a specific portion of the broadcast program is selectively recordable, it is also possible to effectively use the memory capacity.

In accordance with the present invention, it is also possible to selectively play back a specific portion of the recorded broadcast program because the playback type of the broadcast program can be selected by the user.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving a broadcast program in a mobile communication terminal, the method comprising:

receiving a broadcast program in the mobile communication terminal, the broadcast program being segmented into a plurality of contents;

receiving a plurality of identification codes for identifying the plurality of contents, wherein each identification code of the plurality of identification codes is different from all other identification codes of the plurality of identification codes and identifies a corresponding content of the plurality of contents;

receiving an input signal of a selection of at least one identification code of the plurality of identification codes;

recording at least one content of the plurality of contents when a first event occurs, the at least one content corresponding to the selected at least one identification code;

playing back the recorded at least one content when a second event occurs;

manipulating the playback of the recorded at least one content by increasing the playback speed to eliminate a time lag between the playback of the at least one content and the received broadcast program; and determining whether the time lag between the playback of the at least one content and the received broadcast program is eliminated, wherein recording the at least one content comprises:

identifying at least one content corresponding to an advertisement by detecting at least one identification code that indicates an advertisement among the plurality of contents according to the input signal;

selecting at least one specific frame among a plurality of frames of the at least one content, and recording a portion of the at least one content comprising the selected at least one specific frame, wherein the portion further comprises the at least one content without advertisements of the at least one content, wherein the identified at least one content corresponding to an advertisement is not recorded based on the result of the identification step.

2. The method of claim 1, further comprising ending the recording of the at least one content when the time lag between the playback of the at least one content and the received broadcast program is eliminated.

3. The method of claim 1, wherein the first event comprises at least the mobile communication terminal receiving a call, a user initiating a call, or a user pressing a key on the mobile communication terminal to begin recording.

4. The method of claim 1, wherein the second event comprises at least disconnection of a call or input received via a key of the mobile communication terminal to begin playback.

5. The method of claim 1, further comprising displaying the received broadcast program when the time lag between the playback of the at least one content and the received broadcast program is eliminated.

6. A method for receiving a broadcast program in a mobile communication terminal, the method comprising:

receiving the broadcast program in the mobile communication terminal, the broadcast program being segmented into a plurality of contents;

receiving a plurality of identification codes for identifying the plurality of contents, wherein each identification code of the plurality of identification codes is different from all other identification codes of the plurality of identification codes and identifies a corresponding content of the plurality of contents;

receiving an input signal of a selection of at least one identification code of the plurality of identification codes;

recording at least one content of the plurality of contents when a first event occurs, the at least one content corresponding to the selected at least one identification code;

playing back the recorded at least one content when a second event occurs;

manipulating the playback of the recorded at least one content by increasing the playback speed to eliminate a time lag between the playback of the at least one content and the received broadcast program; and determining whether the time lag between the playback of the at least one content and the received broadcast program is eliminated, wherein recording the at least one content comprises identifying at least one content corresponding to an advertisement by detecting at least one identification code that indicates an advertisement among the plurality of contents according to the input signal, wherein manipulating the playback of the at least one content comprises:

selecting at least one specific frame among a plurality of frames of the recorded at least one content, and playing back a portion of the recorded at least one content comprising the selected at least one specific frame, wherein the portion further comprises the recorded at least one content without advertisements of the recorded at least one content, and wherein the identified at least one content corresponding to an advertisement is not recorded based on the result of the identification step.

7. The method of claim 6, wherein the at least one specific frame of the recorded at least one content is played back in a slide show format.

8. The method of claim 6, wherein manipulating the playback of the at least one content further comprises adjusting a playback speed.

9. The method of claim 1, wherein manipulating the playback of the at least one content further comprises adjusting a playback speed.

10. The method of claim 1, wherein determining whether the time lag between the playback of the at least one content and the received broadcast program is eliminated comprises comparing a reception time of a specific frame of the recorded at least one content currently being played back to a reception time of a specific frame of the received broadcast program currently being broadcast.

11. The method of claim 1, wherein determining whether the time lag between the playback of the at least one content and the received broadcast program is eliminated comprises comparing a specific frame of the recorded at least one content currently being played back to a specific frame of the received broadcast program currently being received.

12. The method of claim 1, further comprising receiving time information for each of the contents of the plurality of contents of the broadcast program.

13. The method of claim 12, wherein the plurality of identification codes and the time information are used for selectively recording the portion of the at least one contact.

14. The method of claim 12, wherein the plurality of identification codes and the time information are used for selectively playing back the portion of the recorded at least one content.

15. The method of claim 12, further comprising requesting to receive the plurality of identification codes and the timing information from a broadcast center.

16. The method claim 1, further comprising synchronizing video frames of the at least one content with audio data of the at least one content corresponding to the video frames.

17. The method of claim 8, wherein the playback speed is adjusted according to a remaining capacity of a memory.

18. A method for receiving a broadcast program in a mobile communication terminal, the method comprising:

receiving a broadcast program in the mobile communication terminal, the broadcast program being segmented into a plurality of contents;

receiving a plurality of identification codes for identifying the plurality of contents, wherein each identification code of the plurality of identification codes is different from all other identification codes of the plurality of identification codes and identifies a corresponding content of the plurality of contents;

receiving an input signal of a selection of at least one identification code of the plurality of identification codes;

recording at least one content of the plurality of contents when a first event occurs, the at least one content corresponding to the selected at least one identification code;

playing back the recorded at least one content when a second event occurs; and manipulating the playback of the recorded at least one content by increasing the playback speed to eliminate a time lag between the playback of the at least one content and the received broadcast program, wherein recording the at least one content comprises identifying at least one content corresponding to an advertisement by detecting at least one identification code that indicates an advertisement among the plurality of contents according to the input signal, wherein the playing back of the recorded at least one content comprises:

selecting at least one specific frame among a plurality of frames of the recorded at least one content, and playing back the recorded at least one content from a portion of the recorded at least one content corresponding to the selected at least one specific frame, and wherein the identified at least one content corresponding to an advertisement is not recorded based on the result of the identification step.

19. A method for receiving a broadcast program in a mobile communication terminal, the method comprising:

receiving a broadcast program in the mobile communication terminal, the broadcast program being segmented into a plurality of contents;

receiving a plurality of identification codes for identifying the plurality of contents, wherein each identification code of the plurality of identification codes is different from all other identification codes of the plurality of identification codes and identifies a corresponding content of the plurality of contents;

receiving an input signal of a selection of at least one identification code of the plurality of identification codes;

recording at least one content of the plurality of contents when a first event occurs, the at least one content corresponding to the selected at least one identification code;

playing back the recorded at least one content when a second event occurs; and manipulating the playback of the recorded at least one content by increasing the playback speed to eliminate a time lag between the playback of the at least one content and the received broadcast program, wherein recording the at least one content comprises identifying at least one content corresponding to an advertisement by detecting at least one identification code that indicates an advertisement among the plurality of contents according to the input signal, and wherein the identified at least one content corresponding to an advertisement is not recorded based on the result of the identification step.

* * * * *